United States Patent

Bideau et al.

[11] 4,076,586
[45] Feb. 28, 1978

[54] NUCLEAR REACTOR OF THE PRESSURIZED WATER TYPE

[75] Inventors: Jean Bideau, Breuillet; Jacques Levy, Paris; Jean-Luc Viaud, Bures-sur-Yvette, all of France

[73] Assignee: Commissariat a l'Energie Atomique, Paris, France

[21] Appl. No.: 725,063

[22] Filed: Sep. 21, 1976

[30] Foreign Application Priority Data

Oct. 2, 1975   France .............................. 75 30244

[51] Int. Cl.² .................. G21C 3/30; G21C 3/06; F16G 11/00
[52] U.S. Cl. ....................... 176/78; 176/67; 176/76; 403/30
[58] Field of Search .............. 176/78, 77, 67, 76, 176/74, 79; 403/28, 29, 30

[56] References Cited

U.S. PATENT DOCUMENTS

| Re. 27,173 | 9/1971 | Lass | 176/78 |
| 3,194,743 | 7/1965 | Deddens | 176/78 |
| 3,240,680 | 3/1966 | Laithwaite | 176/78 |
| 3,309,118 | 3/1967 | Anthony | 403/30 |
| 3,805,552 | 4/1974 | Heald | 403/30 |
| 3,816,247 | 6/1974 | Cayol | 176/78 |
| 3,920,517 | 11/1975 | Sasaki | 176/78 |
| 3,954,560 | 5/1976 | Delafosse | 176/78 |

FOREIGN PATENT DOCUMENTS

| 1,279,291 | 10/1960 | France. |
| 1,334,361 | 5/1962 | France. |
| 1,518,953 | 2/1967 | France. |

Primary Examiner—Verlin R. Pendegrass
Assistant Examiner—Donald P. Walsh
Attorney, Agent, or Firm—Sughrue, Rothwell, Mion, Zinn and Macpeak

[57] ABSTRACT

In a pressurized water reactor, the pressure vessel contains a plurality of fuel wrappers of parallelepipedal section supported on a lower grid which carries projecting sleeves equal in number to the wrappers. Each sleeve penetrates into a bore of a wrapper base plate and has a higher coefficient of thermal expansion than the base plate so that its external diameter is smaller than that of the bore in the cold state and equal thereto at the operating temperature of the reactor. The bore is thus clamped against the sleeve as a result of thermal expansion, the fuel assemblies being secured within the wrappers by means of spring-type elastic devices.

12 Claims, 14 Drawing Figures

NUCLEAR REACTOR OF THE PRESSURIZED WATER TYPE

This invention relates to a nuclear reactor which is preferably of the pressurized water type.

It is known that reactors of the pressurized water type essentially consist of a pressure vessel containing a reactor core composed of nuclear fuel. The coolant, in this case water, is circulated within the pressure vessel in order to ensure both cooling of the fuel and removal of the heat produced by the chain reaction.

In general, the reactor core is constituted by a certain number of fuel assemblies which are grouped together in a special arrangement, the entire array of fuel assemblies being supported on the bottom grid of the reactor which is rigidly fixed to the reactor vessel. A core structure is understood to mean all the mechanical components which serve to maintain these fuel assemblies in position and also to guide the control rods which provide adjustments of reactor operation and also serve if necessary to initiate reactor shutdown. The present invention is more precisely concerned with the core structure of this type of reactor.

In reactors of this type, there arise a number of problems which are directly related to the structure of the reactor core. This latter must in fact make it possible to separate the functions to be performed by the core in order that each function may readily be modified at the time of each rearrangement of the core. These functions are: the production of neutrons; a control of reactivity by means of stationary or movable absorbers (the stationary absorbers being made up of burnable poisons) and the mechanical resistance of the fuel assemblies. It is also desirable to limit the consumption of Zircaloy which is generally employed in the fabrication of the core structures.

Nuclear reactors are already known in which the fuel casing or so-called wrapper constitutes the strengthening frame of the fuel assembly. Should it be desired to remove a fuel assembly, it also proves necessary to remove the wrapper, thus complicating the handling operation to a considerable extent and increasing the cost price since the wrapper cannot be used again.

Nuclear reactors are also known in which the entire assembly comprising both the wrappers and the bottom support grid constitutes a single massive part. This arrangement has the disadvantage of producing a build-up of the effects of thermal expansion at the periphery of the structure.

Moreover, in the event of damage, repairs to the structure have to be carried out within the interior of the reactor vessel.

The present invention is precisely concerned with a nuclear reactor comprising a core structure which fully satisfies the different requirements set forth in the foregoing, especially by permitting the replacement of a single remotely-demountable fuel wrapper when this latter exhibits a defect, the fuel assembly being also removable within the wrapper.

A first object of the invention is the construction of a nuclear reactor comprising a pressure vessel and, within said vessel, a lower grid for supporting the reactor core, said grid being rigidly fixed to said vessel, a plurality of fuel wrappers each adapted to contain at least one fuel assembly, each wrapper being designed in the shape of a right-angled parallelepiped, said wrapper being open at the upper end and closed at the lower end by a base plate provided with a bore, said fuel assemblies being each provided with an upper end component which rests on the upper end of one of said wrappers, said lower support grid being such as to have a top face and provided with sleeves equal in number to that of the wrappers, said sleeves being intended to project from said top face of said lower support grid, each sleeve being adapted to penetrate into a bore of a base plate of a wrapper, said sleeve being fabricated from a material having a higher coefficient of thermal expansion than the material forming the base plate of said wrapper, the external diameter of said sleeve being smaller in the cold state than that of the bore of the base plate and equal thereto at the operating temperature of the reactor so that there should take place at this temperature between said sleeve and the bore of said base plate a take-up of play by thermal expansion of an effect of clamping of said wrapper, and a plurality of maintaining units for locking said fuel assemblies in position within said wrappers in a resilient manner.

A second object of the invention is the construction of a wrapper for fuel assemblies constituted by fuel elements of the type comprising an upper end and a lower end and an upper end component on which are fixed the upper ends of the fuel elements, said wrapper together with its fuel assembly of assemblies being such as to constitute a portion of the core of a nuclear reactor designed for operation at a given temperature of the type comprising a pressure vessel in which is placed a lower grid for supporting said reactor core, said grid being such as to have a top face provided with a plurality of sleeves projecting from said face, each sleeve being formed of material having a high coefficient of thermal expansion, said grid being rigidly fixed to said vessel, said wrapper being such as to have the shape of a right-angled parallelepiped and being provided with an open upper end and with a lower end closed by a base plate having a bore in which one of said sleeves is permitted to penetrate, said base plate being formed of material having a coefficient of thermal expansion which is lower than that of the material constituting said sleeve, the internal diameter of said bore in the cold state being larger than the external diameter of said sleeve, said internal diameter being such as to become equal to the external diameter of said sleeve at the operating temperature of said reactor so that there should take place at this temperature between said bore and said sleeve a take-up of play by thermal expansion and an effect of clamping of said bore against said sleeve, said upper end of said wrapper being capable of cooperating with said end component in order to support said fuel assembly or assemblies.

A third object of the invention is the construction of a nuclear reactor comprising a pressure vessel closed at the top by a closure head and, within said vessel, a lower grid for supporting the reactor core, said grid being rigidly fixed to said vessel, an upper grid rigidly fixed to said vessel and placed at the level of connection between said vessel and said closure head, a plurality of wrappers each having an open upper end and a closed lower end, said lower end being provided with means for fixing said wrapper on said lower grid, each wrapper being such as to contain at least one fuel assembly suspended from the upper end of said wrapper, a plurality of vertical units for maintaining said fuel assemblies within said wrappers, each maintaining unit being such as to have an upper end and a lower end, said upper end being joined to said upper support grid by a main elastic device which tends to thrust said maintaining units in the downward direction, said lower end being provided with at least two secondary elastic devices, each secondary elastic device being applied against the upper end of a fuel assembly.

A clearer understanding of the invention will in any case be obtained from the following description of one embodiment of the invention which is given by way of example without any limitation being implied, reference being made to the accompanying drawings, wherein.

Figure 1:
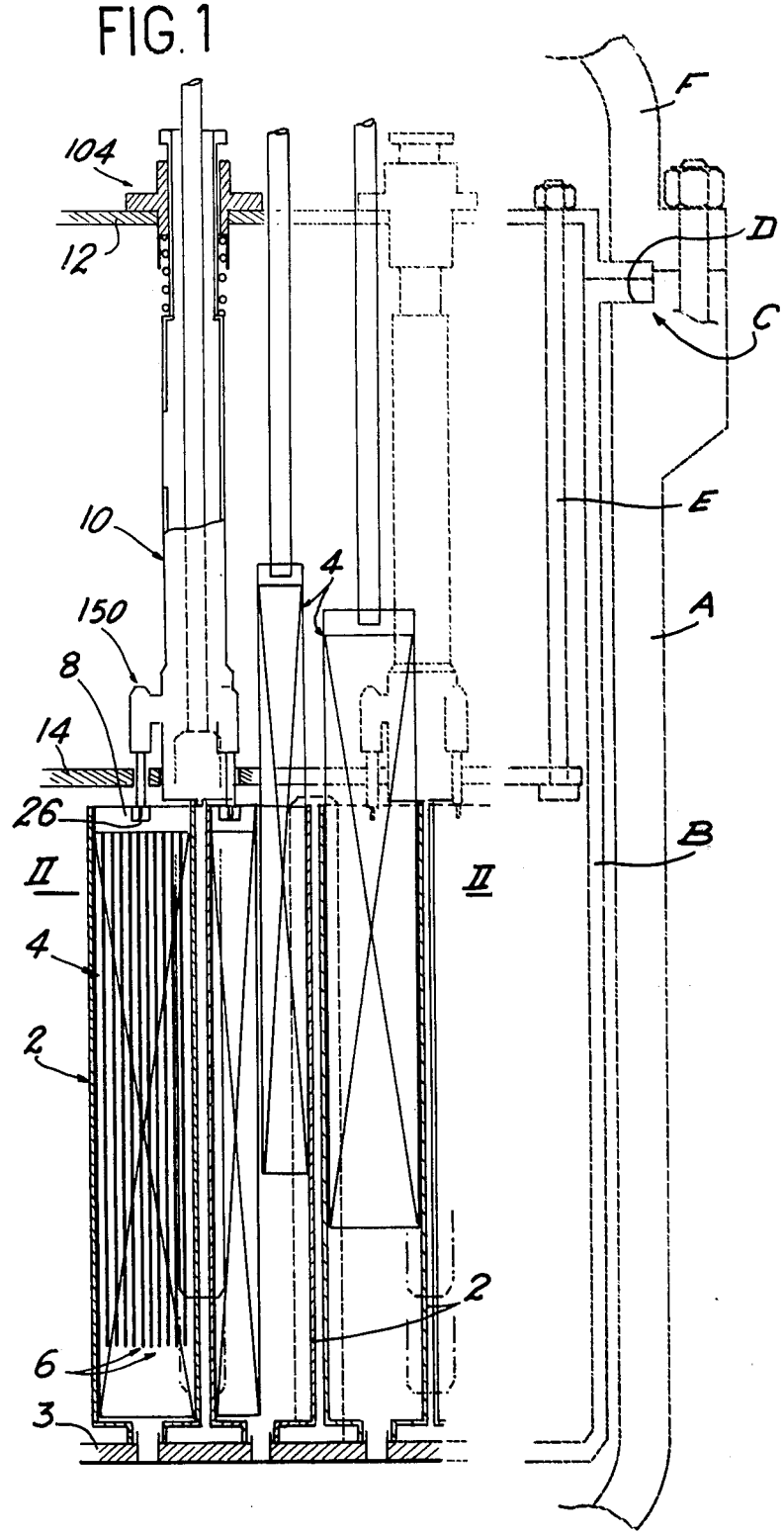
FIG. 1 is a vertical sectional view of the interior of the pressure vessel of a reactor provided with the core structure.

A general schematic view of the interior of the reactor vessel A is shown in FIG. 1 and illustrates the design adopted for the core structure which forms the subject of the invention. The core structure essentially comprises a plurality of casings or so-called fuel wrappers 2 each having a parallelepipedal shape and supported on the lower reactor, core grid 3 which is rigidly fixed to the reactor vessel A. One or a number of fuel assemblies 4 is placed within each wrapper 2. In the particular case of the description, each fuel wrapper 2 contains two fuel assemblies 4 and is square in horizontal cross-section. As shown by way of example in FIG. 2, the wrapper 2a comprises two identical fuel assemblies 4a and 4'a. Each fuel assembly 4 is constituted by a set of parallel plates 6 which are secured to an end component 8 at their upper ends. In this form of construction, the fuel assembly is suspended from the upper end of the wrapper by means of the end components 8.

The core structure further comprises maintaining units 10. Said units are secured at their upper ends to the upper grid 12 which is rigidly fixed to the reactor vessel and traverse the upper core plate or intermediate grid 14. Each maintaining unit 10 is secured to the plate 12 with one degree of freedom in the vertical direction by means of the upper connecting-flange unit 104; said maintaining unit also traverses the plate 14 through bores, the sole function of said plate 14 being to maintain in position the lower ends of the units 10 in the transverse direction.

The lower support grid 3 is preferably secured to the lower end of a barrel B which surrounds the reactor core and is rigidly fixed to the reactor vessel by means of a flange C which cooperates with an annular shoulder D of the reactor vessel. The upper core support grid 12 also rests on said annular shoulder by means of a flange. Finally, the intermediate grid 14 is rigidly fixed to the reactor vessel by means of the upper grid 12. In fact, these two grids are connected to each other by means of tie-rods E. The reactor vessel A is closed by the lid or closure head F.

Figure 3:
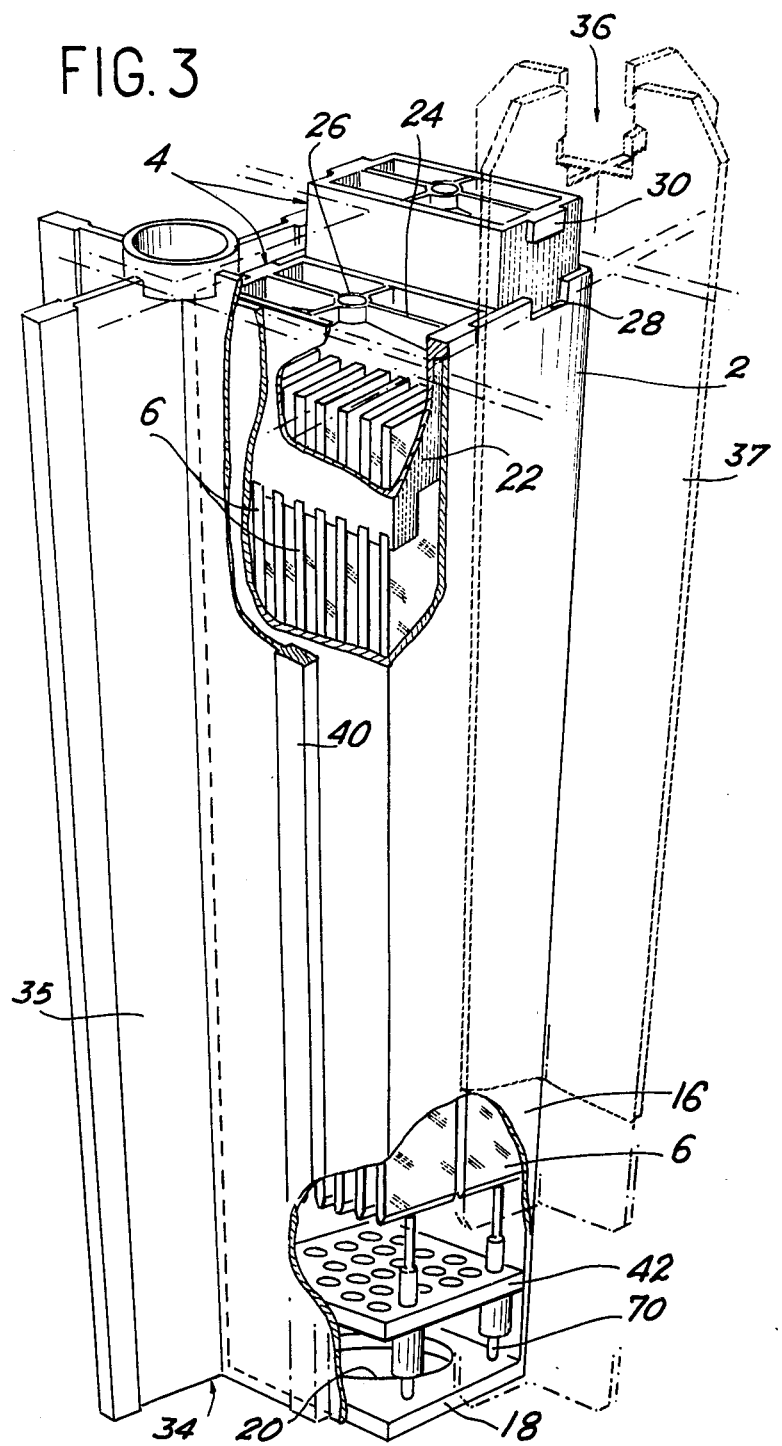
FIG. 3 is a view in perspective showing a wrapper and a movable control rod.

FIG. 3 is a partially cutaway view in perspective showing one form of construction of the wrappers 2 in accordance with the invention. Said wrappers have the shape of a right-angled parallelepiped which are thus constituted by four sides or walls joined together in known manner. The walls of the wrapper 2 will each be designated by the reference 16 and they have the same sizes for example. The wrapper is provided at the lower end with a base plate 18 which is attached to the sides 16 and has a central bore 20, the intended function of which will hereinafter be more fully explained. Each fuel element 4 is constituted for example by parallel fuel plates 6. Said plates are attached at their upper ends to an end component 22 which is braced for example by ribs such as the rib 24. A centering sleeve 26 is provided at the center of the end component 22. Each fuel element is supported by the wrapper 2 by means of notches such as those designated by the reference 28 and formed at the upper extremity of predetermined plates 16 which constitute the sides of the wrapper in cooperating relation with bosses 30. In this manner, the fuel elements are suspended from the upper end of the wrapper. Free expansion of the fuel elements under the action of high temperatures is thus permitted.

Figure 2:
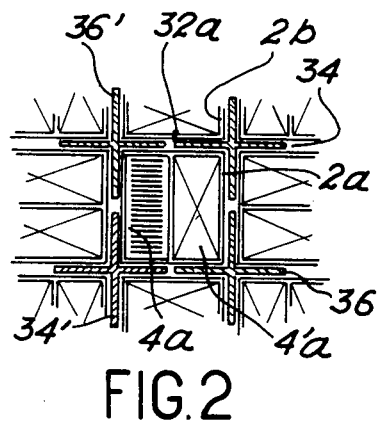
FIG. 2 is a partial horizontal sectional view taken along line II—II of FIG. 1.

As shown in FIGS. 2 and 3, each fuel wrapper 2 containing two fuel assemblies such as, for example, the assemblies 4a and 4'a (in the case of the fuel wrapper 2a) is surrounded by reactivity control rods which are cruciform. Between two adjacent fuel wrappers 2a and 2b, provision is made for a passage 32a in which the control rods are guided. Since the fuel wrappers are spaced at uniform intervals in a horizontal plane and arranged in "lines" and "columns", it is apparent that the passages between the fuel wrappers are disposed in two orthogonal directions defined by the walls of the wrappers 2. The control rods aforesaid are of two types, namely on the one hand stationary neutron absorbing rods 34 formed of burnable poisons and on the other hand movable control rods such as 36 which undergo displacements in a vertical direction corresponding to insertion of said rods into the reactor core to a greater or lesser extent and thus make it possible to adjust the reactivity of the reactor. The passages clearly have a thickness (distance between two parallel walls of adjacent fuel wrappers) which is slightly greater than the thickness of the arms of the control rods.

A neutron absorbing rod 34 and a movable rod 36 are shown diagrammatically in FIG. 3. In accordance with a known design, these control rods are of cruciform shape with four arms (35 and 37 respectively). At the end of each arm 35 of the cross constituted by the stationary neutron absorbing rods 34, provision is made for a spacer member 40 which extends up to the full height of the stationary neutron absorbing rod. These spacer members 40 serve to maintain the spacing between the walls of two adjacent fuel wrappers or in other words to maintain the thickness of the passage 32a.

Said spacer members can also be fixed on the actual walls of the fuel wrappers.

There is also shown in FIG. 3 the diaphragm 42 which is located in the lower portion of the fuel wrapper 2. The method adopted for mounting said diaphragm in position will be described below in greater detail.

Figure 4:
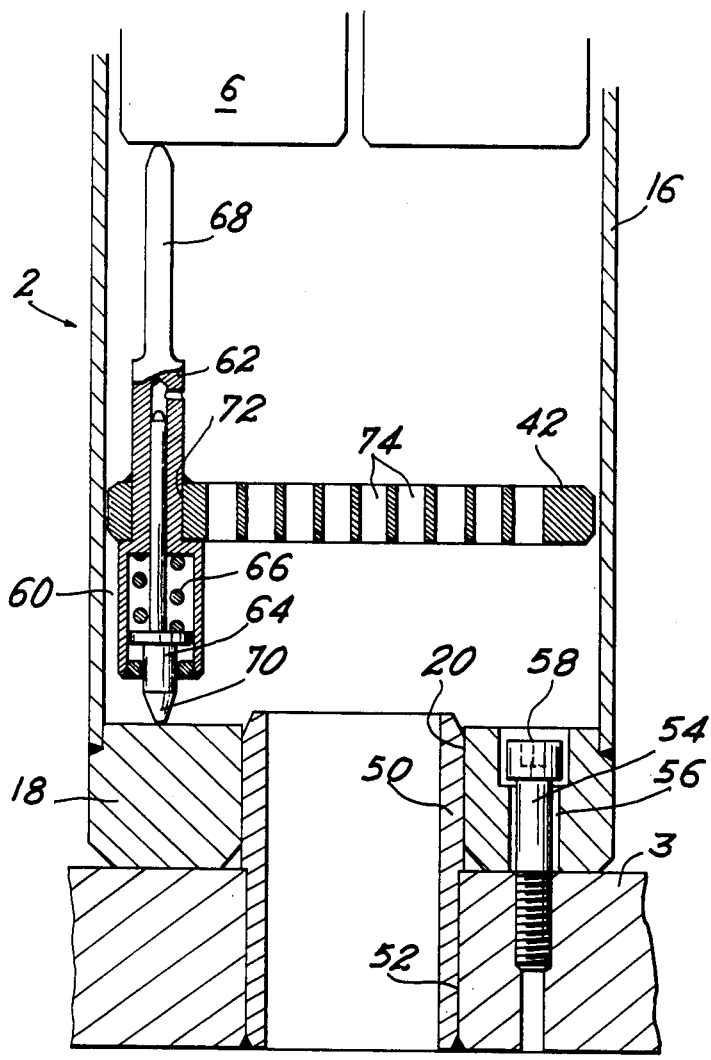
FIG. 4 is a vertical sectional view of the lower portion of a wrapper.

In FIG. 4, there is shown a first form of construction of the lower portion of a fuel wrapper 2 and more especially the method adapted for mounting said wrapper on the lower support grid 3 of the reactor.

The removable attachment of each fuel wrapper 2 to the lower support grid 3 of the reactor is so designed as to permit the remote positioning and withdrawal of said wrapper without entailing the need for complex operations. The fuel wrapper is rigidly fixed on the support grid 3 by means of the bore 20 which is formed in the base plate 18 of the wrapper and cooperates with a sleeve 50, said sleeve being in turn rigidly fixed to the lower grid 3. In more precise terms, the lower grid 3 is provided opposite to each fuel wrapper 2 with a bore 52 in which is fixed the sleeve 50 and this latter projects from the top face of the grid 3. By way of example, said sleeve is welded to the grid 3. The bore 20 has a diameter such that, in the cold state, said diameter is slightly larger than the external diameter of the sleeve 50. In the same manner as the support grid 3, said sleeve 50 is also formed of stainless steel. On the contrary, both the lower plate 18 and the remainder of the fuel wrapper 2 are formed of Zircaloy. By reason of the differences in diameter, the sleeve 50 is employed for centering and guiding the fuel wrapper at the time of positioning of this latter on the lower grid 3. During normal operation, that is to say when the structure consisting of all the above-mentioned components is brought to a temperature of the order of 300° C, the relative expansions of Zircaloy and of stainless steel are such that the increase in external diameter of the sleeve 50 is much greater than the increase in internal diameter of the bore 20. There is thus obtained a centering and especially a clamping of the fuel wrapper onto the lower core support grid 3 without play as a result of the differential expansion. For safety reasons, however, mounting of the wrapper on the lower grid is completed by means of a number of screws such as the screw 54 which transverse the base plate 18 through bores such as the bore 56. The head 58 of each screw 54 has a shape such as to permit tightening of this latter with the aid of a tool from the exterior of the reactor. At the time of this tightening operation, it is readily apparent that the fuel wrappers do not contain fuel assemblies and that the diaphragm 42 has not yet been fitted in position, (except in the case of the second embodiment).

As indicated earlier, the lower portion of the fuel wrapper is provided with a removable diaphragm 42 which serves to regulate the flow rate of coolant liquid (such as water, for example) and the distribution of said flow rate within the fuel assembly. According to the first embodiment, said diaphragm is mounted on mechanical units such as the unit 60. Each mechanical unit comprises a body 62, a rod 64 which is capable of moving within said body and a spring 66 which produces action on said rod. Ribs 68 are fixed on the diaphragm at right angles to this latter and at right angles to the fuel plates. The top edge of each rib is in contact with the lower end of each plate 6. The rod 64 terminates in a point 70 which bears on the top face of the base plate 18. The body 62 traverses the diaphragm 42 through bores such as the bore 72, the body 62 being clearly welded onto the diaphragm 42, the orifices of which are designated by the reference 74. By virtue of this arrangement, the diaphragm 42 is removable after extraction of the fuel assemblies. Furthermore, the elastic device permits compensation for the play produced by thermal expansions. However, it is noted that, by virtue of the arrangement of the elastic design 66 beneath the diaphragm 42, there will not be any parasitic oscillations resulting from the pressure drop across the orifices 74.

Figure 4A:
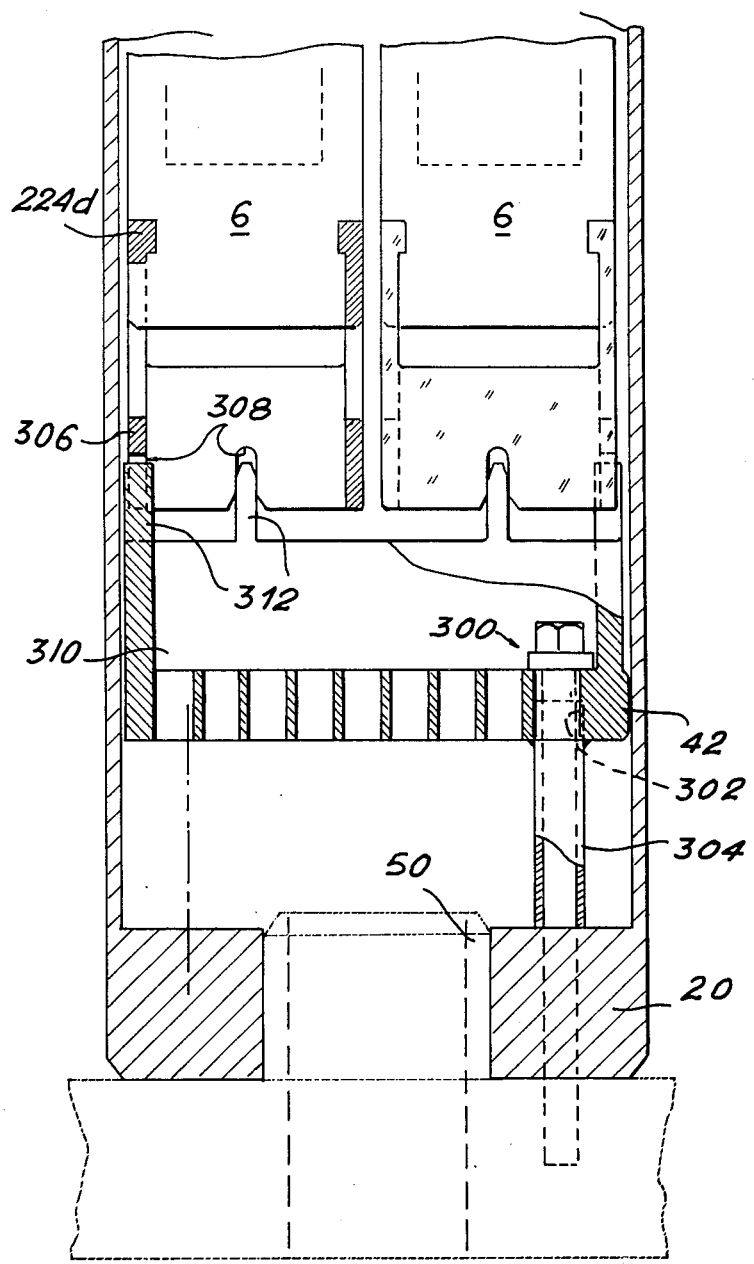
FIG. 4a is an other embodiment of the lower portion of a wrapper.

In FIG. 4a, there is shown a first alternative arrangement for fixing the diaphragm 42 in position. The diaphragm is secured by means of four lock-screws such as the screw 300 which transverse the diaphragm through bores 302 and which are screwed into the base plate 20. Tubular spacer members such as the member 304 maintain the spacing between the diaphragm and the base plate. In order to prevent oscillation of the lower ends of the plates 6, the lower comb 224d (shown in FIG. 4a) has an extension in the form of a plate 306 provided with slots 308 which form mortises. A web 310 is secured to the periphery of the diaphragm 42. Tenons 312 formed on the top edge of said web are intended to penetrate into the slots 308 and thus prevent relative displacements of the lower ends of the fuel assemblies in a horizontal plane.

Figure 4B:
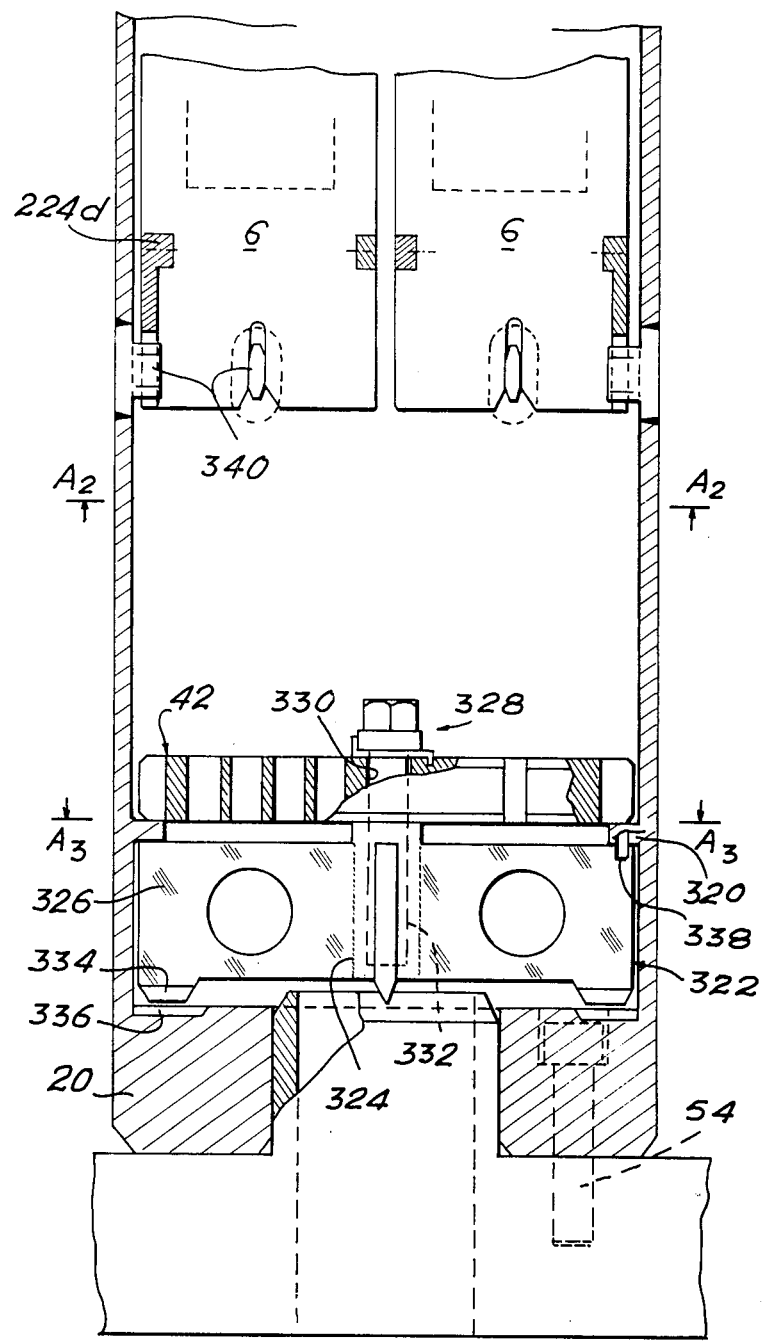
FIGS. 4b, 4c and 4d are still an other embodiment of the lower portion of a wrapper according to a vertical section plane and two horizontal section planes.
Figure 4C:
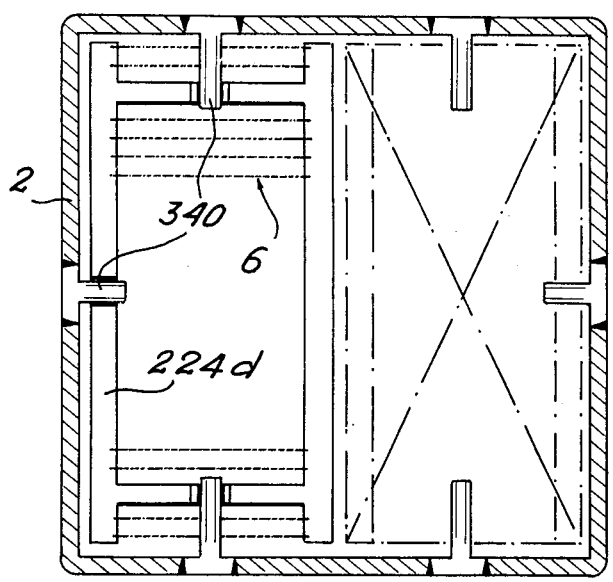
Figure 4D:
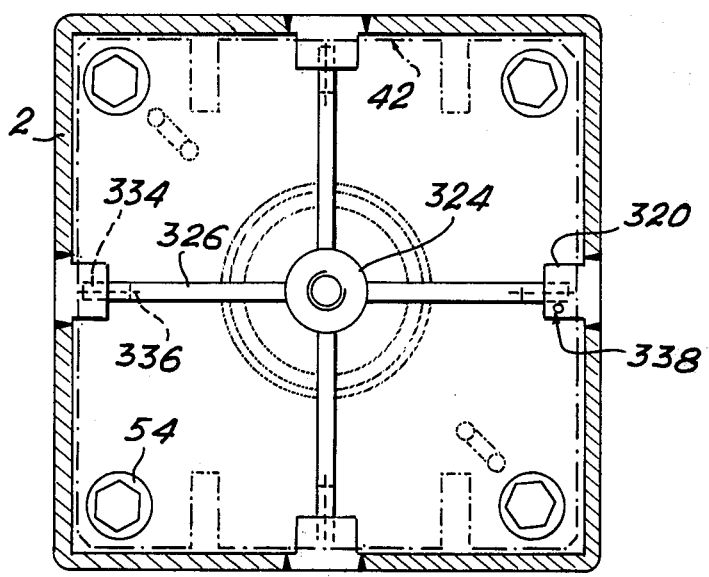

In FIGS. 4b, 4c and 4d, there is shown a second alternative arrangement for fixing the diaphragm 42. In this form of construction the fuel wrapper 2 is provided internally on each of its four faces with a bearing member such as the member 320. After it has been placed in position the diaphragm rests on these four bearing members 320 and is maintained in position by means of a spider 322 having a central hub 324 and four arms such as the arm 326. A lock-screw 328 traverses the diaphragm 42 through a bore 330 and its threaded end cooperates with the internally-threaded bore 332 formed in the hub 324. When the spider is in the locking position, the ends of the arms are applied against the bottom faces of the bearing members 320. The assembly consisting of diaphragm and spider is therefore locked in position. The spider is obviously inserted with its arms disposed along the diagonals of the fuel wrapper 2. In order to secure the spider 322 in the bottom position prior to clamping by means of the screw 328, each arm 326 is provided with a heel-shaped projection 334 which penetrates into a recess 336 formed in the base plate 20. When the lock-screw 328 is initially tightened, the spider is lifted and the heel-shaped projections 334 move clear of the recesses 336. The spider is then keyed rotationally by means of stop-lugs 338 which are rigidly fixed to the bottom faces of the bearing members 320.

Positional locking of the lower ends of the fuel assemblies is obtained by means of tenons 340 which are rigidly fixed to the walls of the fuel wrapper 2. Said tenons cooperate with mortises which are constituted on the one hand by slots such as the slot 342 formed at the lower ends of the fuel assembly plates 6. The lower fastening cross-member 224d (shown in FIG. 7) is rigidly fixed to a vertical plate provided with slots which cooperate with a certain number of the tenons 340.

It is apparent that the diaphragm 42 is removable in all three cases. This result is important since it is possible to gain access to the bottom of the pressure vessel by means of the large-diameter openings of the sleeves 50 after the fuel assemblies and the diaphragm have been removed. This permits the introduction of instruments for checking the state of the bottom portion of the pressure vessel.

Figure 5:
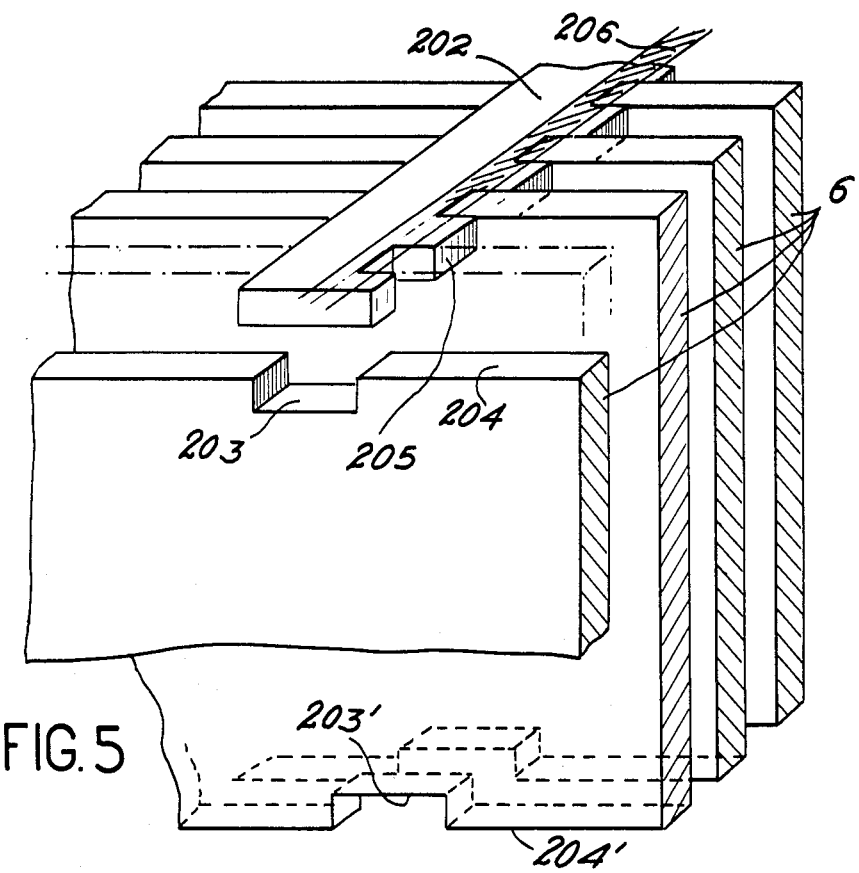
FIGS. 5 and 6 illustrate one example of construction of a plate-type fuel assembly.
Figure 6:
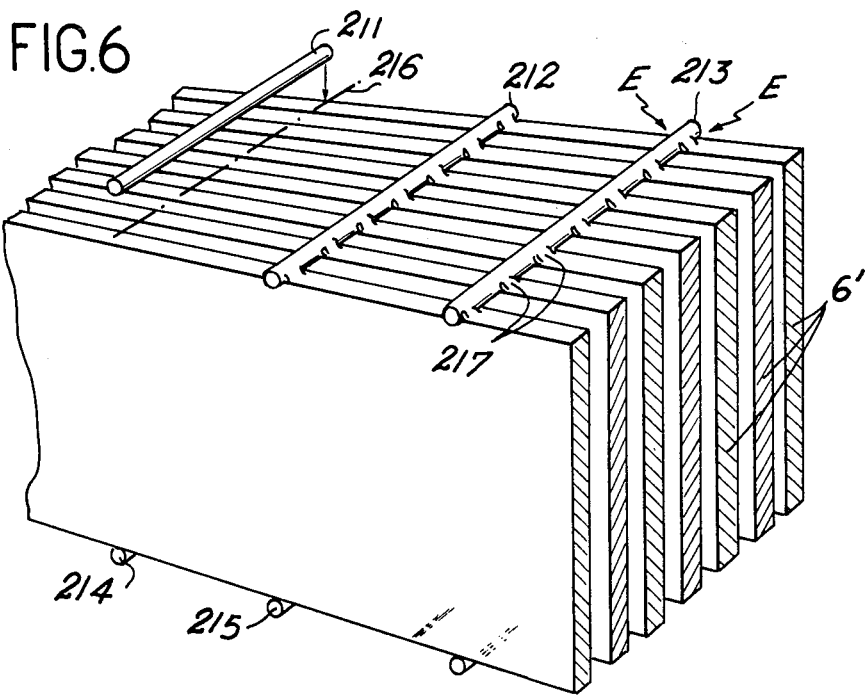
Figure 7:
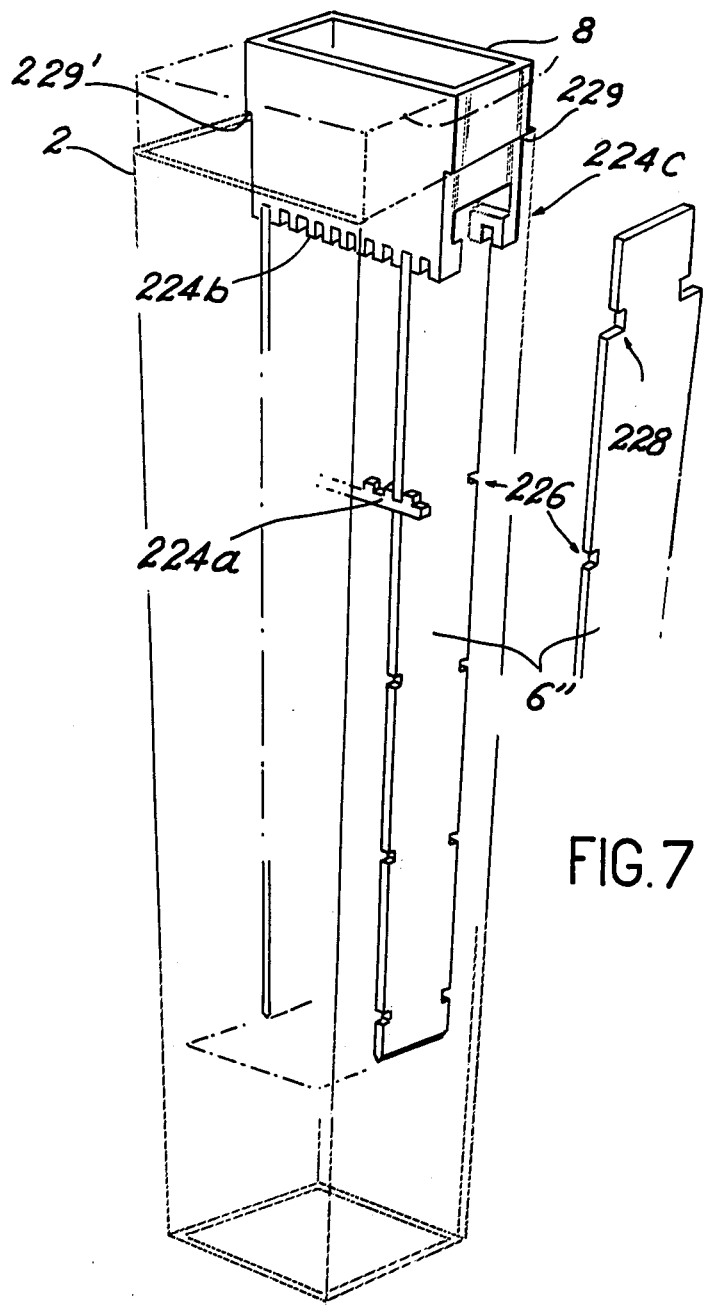
FIG. 7 illustrates one example of connection between the fuel plates and the end component of the fuel assembly.

In FIGS. 5, 6 and 7, there is shown a particular embodiment of the fuel assemblies of the plate type and of the coupling effected between said assemblies and the end component.

As shown in FIG. 5, the assembly is constituted by fuel plates 6 which are placed in parallel relation and joined together by means of cross-members 202, only one of which is illustrated in the drawing. This comb-shaped cross-member 202 is placed at right angles to the fuel plates 6 and is flush-mounted within grooves 203 of corresponding profile which are formed in the external edges 204 of the fuel plates 6.

The cross-member 202 is provided with teeth 205 which extend beyond the grooves 203 between the fuel plates 6 in the plane formed by the surface of the edges 204 of the plates 6 in order to maintain accurate spacing between adjacent fuel plates.

The other cross-members which are not shown in the drawing are arranged in the same manner and located at intervals which are not necessarily equal on the opposite edges 204 and 204' of the fuel plates of the assembly. To this end, the edges 204' of the fuel plates are also provided with grooves 203' which are identical with the grooves 203 for the flush-mounting of said cross-members.

The fuel plates 6 and the cross-member 202 are joined together so as to form a single-unit assembly, this being achieved by edge-to-edge welding at the level of the base of each tooth 205.

The construction of an assembly of this type can be carried out as follows: the plates 6 are first placed in a frame so as to maintain the spacings intended for the assembly the comb-shaped cross-members 202 are then flush-mounted within the grooves 203 formed in the external edges of the plates at intervals which may not be equal along the entire assembly; said cross-members are then fixed on each assembly plate by welding at the level of the base of each tooth 205, for example by means of an electron beam which follows the path 206 shown in cross-hatchings in FIG. 5.

This assembly solution offers many advantages. In the first place, the replacement of a fuel wrapper by cross-members permits a substantial economy of material. In the second place, this solution leads to great ease of construction both in regard to machining of the cross-members which are of simple shape and in regard to rigid assembly of the entire structure by welding since this operation is performed on the external edges of the assembly, with the result that the welds can readily be checked.

In this mode of assembly, cross-members of different shapes may be employed. By way of non-limitative example, they can be constructed in the form of elongated bars or strips of circular section, of square section, of rectangular section or of trapezoidal section.

Referring now to FIG. 6, there is shown an alternative form of assembly in which the cross-members employed are of circular section and designed in the form of wires.

The fuel plates 6' shown in this figure are placed parallel to each other and joined together by means of cross-members in the form of wires such as those designated by the references 211, 212, 213, 214 and 215. The cross-member 201 is illustrated in a displaced position above the fuel assembly. In its final position, the cross-member is intended to be applied at right angles to the fuel plates 6' and in contact with the external edges of the plates 6' along the path of the line 216 shown in chain-dotted lines.

The cross-members 212, 213, 214, 215 are distributed on each side of the fuel assembly and are also applied at right angles to the fuel plates on the external edges of these latter.

Rigid assembly of the entire structure is ensured by welding or brazing of the cross-members 211, 212, 213, 214 and 215 on the fuel plates 6' at each intersection as designated by the reference 217. Attachment of the cross-members to each fuel plate of the assembly can be carried out in particular by resistance welding as represented diagrammatically in the figure by the arrows E.

In all cases, in order to facilitate the welding operations, the cross-members are advantageously formed of material which is identical with that of the cladding of the fuel plates. When these fuel assemblies are intended to be loaded into a reactor of the light-water type, Zircaloy is preferably chosen for the fabrication of the fuel-plate cladding and for the fabrication of the cross-members.

Referring to FIG. 7, there can be seen one example of construction of an end component 8.

This figure illustrates a fuel assembly in the position which it occupies within a nuclear reactor. In this position, the assembly of fuel plates 6'' is placed vertically and surrounded by a fuel wrapper 2 of parallelepipedal shape which can be employed in this example for accommodating two assemblies of nuclear fuel plates. In these assemblies, only one of which is illustrated in the figure, the fuel plates 6'' are connected together by means of comb-shaped cross-bars such as those designated by the reference 224. Said cross-bars are fitted in corresponding grooves 226 which have previously been machined in the fuel plates 6'' and which are welded to the external edge of each plate 6'' of the fuel assembly in accordance with the form of construction illustrated earlier in FIG. 5. At the top portion of the fuel assembly, the opposite cross-bars 224b and 224c form an integral part of an end component 8 of parallelepipedal shape which projects above the assembly of plates 6''. The two opposite walls of the end component 8 which are placed at right angles to the plates 6'' of the fuel assembly are shaped at the lower portions thereof so as to perform the function of the cross-bars 224 and are fitted within grooves 228 provided for this purpose in the external edges of the plates 6''. The other two opposite walls of the end component 8 which are parallel to the fuel plates 6'' are provided with a shouldered portion 229 or 229' which is intended to be applied against the corresponding wall of the fuel wrapper 2. In this manner, the assembly of fuel plates 6'' rests on the walls of the wrapper 2 and is suspended from said end component 8 within the interior of said fuel wrapper 2.

Figure 8:
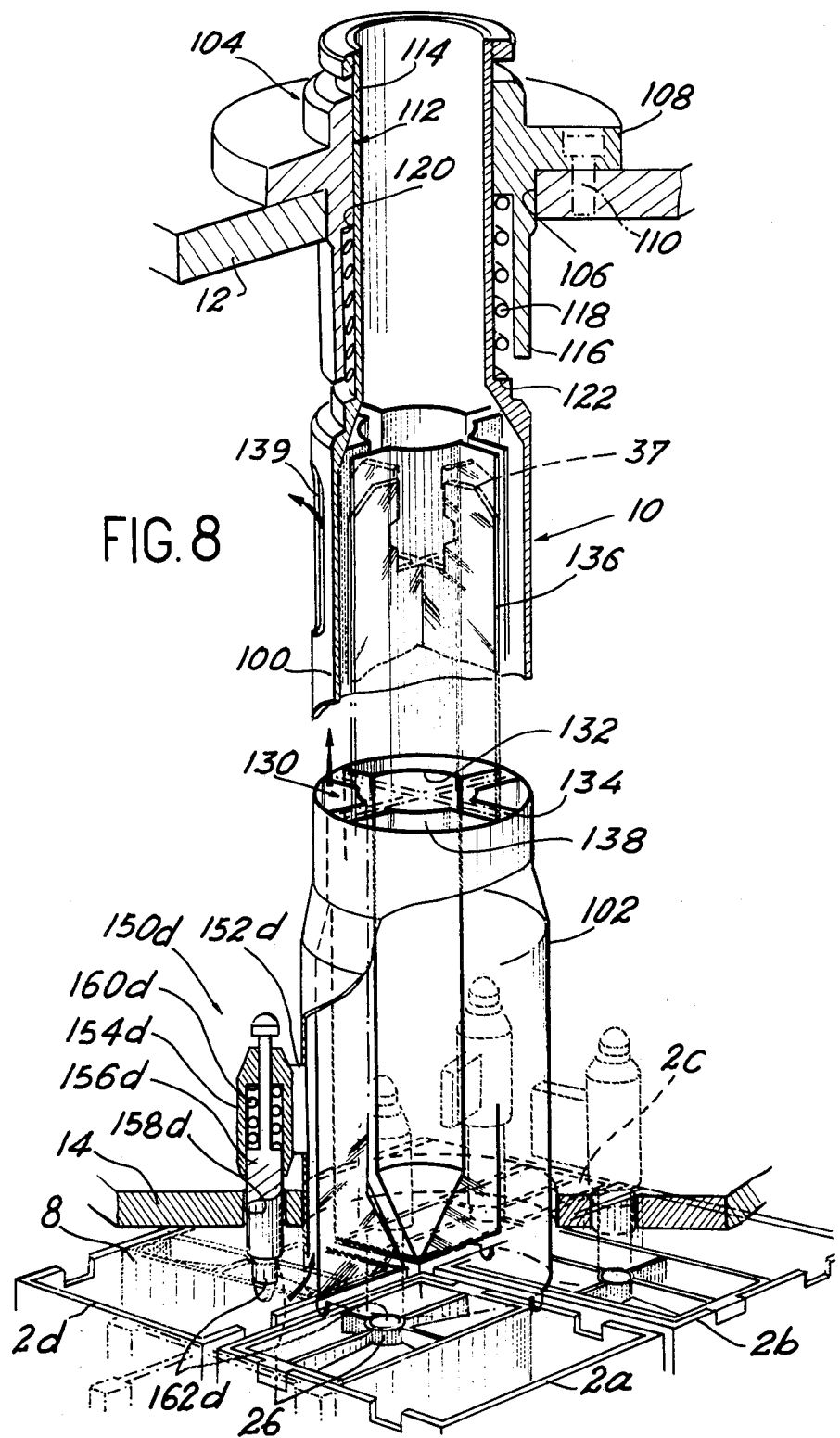
FIG. 8 is a partial sectional view in perspective showing a maintaining unit.
Figure 9:
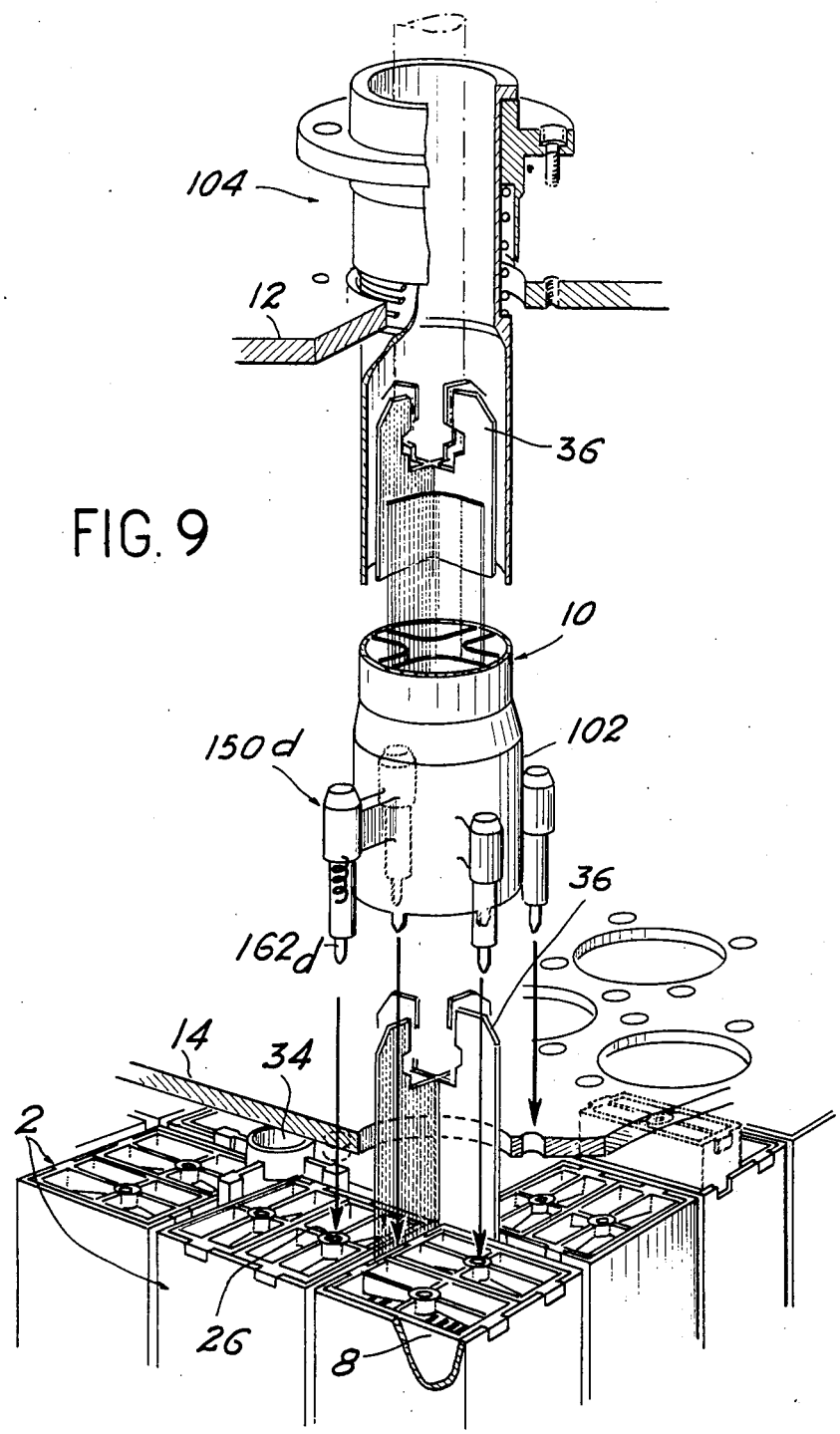
FIG. 9 is a view in perspective showing the same maintaining unit prior to positioning within the reactor.

In FIGS. 8 and 9, there is shown in perspective and in partial cross-section one form of construction of the units for maintaining and guiding control rods as designated by the reference 10. It is postulated in FIG. 9 that the operation being performed consists in positioning the maintaining unit 10 in order to provide a clearer explanatory illustration of the cooperation between the maintaining unit 10, the different plates of the reactor and the fuel assemblies. In actual fact, the maintaining units form in conjunction with the reactor core support grids 12 and 14 a one-piece assembly which is placed in position in a single operation.

The maintaining unit 10 comprises a body 100 having a generally cylindrical shape and having an extension at the lower end in the form of a lower cylindrical shell 102 at the level of the intermediate grid 14. The unit 10 is provided at its upper end with an upper connecting-flannge unit 104 which serves to secure and to center the unit 10 within the upper core support grid 12, said flange unit being intended to traverse said upper grid through the bore 106. The connecting-flange unit 104 comprises an annular flange 108 for attaching said unit to the support grid 12 by means of screws 110. Said flange unit also has a face 112 for guiding the extension 114 of the body 100 and a lower skirt 116. The connection between the body 100 and the connecting-flange unit 104 is ensured by a main elastic device 118 which surrounds the extension 112 and is located within the interior of the skirt 116. The elastic device 118 is applied at one end against the face 120 of the connecting-flange unit 104 and at the other end against an annular shoulder 122 formed on the external face of the body 100. As indicated earlier, the maintaining units 10 have in fact a double function: on the one hand, they serve to guide the movable control rods 36 so as to permit insertion and withdrawal of these latter from the reactor core and, on the other hand, said units serve to maintain the fuel assemblies 4 within the individual fuel wrappers 2.

This function of position-maintenance of the fuel assemblies within the wrappers is necessary for the following reasons:

As mentioned earlier, the fuel assemblies are suspended from the upper end of the wrappers 2 as a result of the cooperation of the bosses 30 and of the notches 28. Since the coolant liquid also flows upwards through the reactor core, it is understood that under the action of this liquid, the fuel assemblies 4 have a tendency to lift. The maintaining units 10 therefore also have the design function of preventing this lifting movement or at least of controlling this latter while permitting the free action of thermal expansion of the different portions of the internal reactor structure.

In the embodiment described in the foregoing, a single movable control rod is assigned to four juxtaposed fuel wrappers. Said wrappers are designated in FIG. 8 by the references 2a, 2b, 2c and 2d. Moreover, it has been indicated that each wrapper contained two independent fuel assemblies. Each maintaining unit will serve on the one hand to guide the movable control rod which cooperates with the four fuel wrappers and on the other hand to maintain in position one of the two fuel assemblies of each of the four wrappers and more precisely the one which is located nearest the movable control rod. Guiding of each movable control rod is carried out by means of partitions 130 which extend up to the full height of the body 100 of the unit 10. These partitions 130 form within the body 100 a central cylindrical passage 132 through which the control rod drive unit can be inserted. Said partitions are also provided with four radial slots such as the slot 134 which are located at right angles to each other and permit the passage of the arms 136 of the control rods. The partitions aforesaid also define between themselves and the body 100 four passages 138 for the circulation of the coolant liquid which cooperate with the openings 139. The slots 134 extend within the lower cylindrical shell so as to ensure that a contact is established between the shell and the wrappers and that continuity is ensured between the slots 134 and the passages 32. More over this contact between these two members constitutes a stop which limits the displacements due to the elastic devices.

The function of position-maintenance of the fuel assemblies within the wrappers is performed on the one hand by the annular flange 108 which permits the fastening of the unit 10 on the upper support grid 12 and on the other hand by two elastic devices which serve to compensate for thermal expansion processes. The first elastic device or main elastic device is constituted by the spring 118. The maintaining unit also comprises secondary elastic devices which are equal in number to the fuel assemblies to be fixed in position. In this case, there are therefore four secondary elastic devices. Each secondary elastic device is fixed on the cylindrical shell 102. If consideration is given to the secondary elastic device 150d, it is seen that this latter is connected to said shell 102 by means of a radial arm 152d. The device 150d comprises a stationary body 154d which is rigidly fixed to the arm 152d and a movable locking-pin 156d. The locking-pins 156 traverse the grid 14 through bores 158a, 158b, 158c and 158d. The locking-pins 156 are continuously urged downwards by the springs 160. Each lower end of the locking-pins 156 penetrates into the sleeve 26 of the corresponding fuel assembly. It is readily apparent that each locking-pin has an annular shoulder 162 which cooperates with the sleeve.

The operation of the installation is as follows:

Each unit 10 maintains the fuel assemblies applied against the wrappers by means of the main elastic device 118 which is remote from the reactor core and serves to compensate for differential expansions and by means of the secondary elastic devices 150 which serve to compensate for differences in level arising from manufacturing tolerances of the fuel wrappers. Since the locking-pins 156 are positioned in plan and maintained in position mechanically by means of their passage within the intermediate grid 14, any horizontal stress applied to said locking-pins by the sleeves 28 is transmitted to said grid 14 and sustained by this latter alone.

Figure 10:
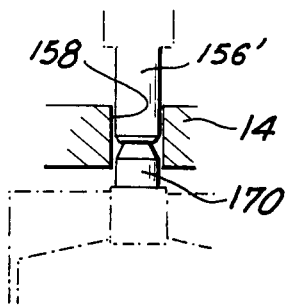
FIG. 10 illustrates an alternative embodiment of the lower portion of the maintaining unit.

In an alternative embodiment shown in FIG. 10, the locking-pins 156 are replaced by locking-pins 156' which are shorter in length and thus penetrate into the bores 158 of the grid 14 only to a partial extent. In this case, the end components 8 each comprise another locking-pin 170 which is rigidly fixed to the ribs 24. Said locking-pins 170 replace the sleeve 26 and also penetrate into the bores 158 to a partial extent. Position-maintenance of the end components is obtained by bringing the end of a locking-pin 156' into contact with the end of a locking-pin 170.

If consideration is given to the reactor core as a whole excluding the fuel assemblies located at the periphery of the core, one maintaining unit 10 must be provided for two fuel wrappers 2 in the case in which each wrapper is surrounded by two movable control rods (36 and 36') and by two stationary shim rods (34 and 34') of the burnable poison type. Moreover, it is self-evident that the number of arms 152 and therefore of secondary elastic maintaining devices depends on the number of fuel assemblies per wrapper but may also depend on the number of wrappers associated with a single cruciform control rod. For example, if there were only one fuel assembly per wrapper, it would only be necessary to ensure that each maintaining unit 10 comprises two secondary elastic maintaining devices.

In actual fact, some fuel wrappers do not have movable control rods. In this case, the corresponding maintaining units do not need to perform the guiding function and are not provided with internal partitions 130.

Moreover, it is an advantage to displace the main elastic device 118 to the upper portion of the reactor core since this has the effect of preventing this latter from being subjected to a high neutron flux. It is in fact known that such operating conditions give a brittleness which may produce a breaking of the piece.

This arrangement of the reactor core structure offers many advantages. It can be stated in particular that, by virtue of the independence of the fuel assemblies with respect to the fuel wrappers, it is possible at the time of rearrangement of fuel or at the time of a refueling operation to discharge the fuel assembly without removing the wrapper. This clearly simplifies operations to a considerable extent and permits a reduction in the consumption of Zircaloy, which is the material employed in the fabrication of the fuel wrappers. Moreover, by virtue of the fact that the movable absorbers are placed around the fuel wrapper, they remain within the reactor core at the time of rearrangement operations, thus permitting enhanced safety at the time of refueling. Moreover, once the fuel assembly or assemblies have been removed from a wrapper, it is possible to adjust the diaphragm 42 according to the fuel which is to be placed in said wrapper.

Finally, since positioning and attachment of the base plate of each fuel wrapper are carried out by means of a system which permits compensation for play resulting from differential expansion, it is thus possible to prevent parasitic leakages, with the result that any simultaneous outflow of coolant from the fuel wrappers is accordingly limited.

We claim:

1. A nuclear reactor comprising a pressure vessel and, within said vessel,
    a lower grid for supporting the reactor core, said grid being rigidly fixed to said vessel,
    a plurality of fuel wrappers each adapted to contain at least one fuel assembly, each wrapper being designed in the shape of a right-angled parallelepiped, said wrapper being open at the upper end and closed at the lower end by a base plate provided with a bore,
    said fuel assemblies being each provided with an upper end component which rests on the upper end of one of said fuel wrappers,
    said lower support grid being such as to have a top face and provided with sleeves equal in number to that of the fuel wrappers, said sleeves being intended to project from said top face of said lower support grid, each sleeve being adapted to penetrate into a bore of a base plate of a fuel wrapper, said sleeve being fabricated from a material having a higher coefficient of thermal expansion than the material forming the base plate of said fuel wrapper, the external diameter of said sleeve being smaller in the cold state than that of the bore of the base plate and equal thereto at the operating temperature of the reactor so that there should take place at this temperature between said sleeve and the bore of said base plate a take-up of play by thermal expansion and an effect of clamping of said fuel wrapper, and
    a plurality of maintaining units for locking said fuel assemblies in position within said fuel wrappers in a resilient manner.

2. A wrapper for fuel assemblies constituted by fuel elements of the type comprising an upper end and a lower end and an upper end component on which are fixed the upper ends of the fuel elements, said wrapper together with its fuel assembly or assemblies being such as to constitute a portion of the core of a nuclear reactor designed for operation at a given temperature of the type comprising a pressure vessel in which is placed a lower grid for supporting said reactor core, said grid being such as to have a top face provided with a plurality of sleeves projecting from said face, each sleeve being formed of material having a high coefficient of thermal expansion, said grid being rigidly fixed to said reactor vessel, said wrapper being such as to have the shape of a right-angled parallelepiped and being provided with an open upper end and with a lower end closed by a base plate having a bore in which one of said sleeves is permitted to penetrate, said base plate being formed of material having a coefficient of thermal expansion which is lower than that of the material constituting said sleeve, the internal diameter of said bore in the cold state being larger than the external diameter of said sleeve, said internal diameter being such as to become equal to the external diameter of said sleeve at the operating temperature of said reactor so that there should take place at this temperature between said bore and said sleeve a take-up of play by thermal expansion and an effect of clamping of said bore against said sleeve, said upper end of said wrapper being capable of cooperating with said end component in order to support said fuel assembly or assemblies.

3. A fuel wrapper according to claim 2 and comprising a diaphragm beneath the lower end of said fuel assembly or assemblies, said diaphragm being locked in position by means of a plurality of mechanical units rigidly fixed to said diaphragm and applied respectively against the lower end of a fuel assembly and against said base plate, each mechanical unit being provided with an elastic portion between said diaphragm and said base plate.

4. A fuel wrapper according to claim 2 and comprising a diaphragm beneath the lower end of said fuel assembly or assemblies, said diaphragm being locked by means of a plurality of lock screws which traverse said diaphragm through bores and which are screwed into said base plate, tubular spacer surrounding said lock screws in order to maintain a spacing between said diaphragm and said base plate;

5. A fuel wrapper according to claim 2 and comprising a diaphragm beneath the lower end of said fuel assembly or assemblies, said diaphragm being locked by means of bearing members secured to each internal face of said fuel wrapper and provided with an upper face and a bottom face by means of a spider having a threaded central hub and four arms, and by means of a lock screw traversing said diaphragm through a bore and provided with a threaded end, said threaded end cooperating with said threaded central hub in such a way that said arms are applied against said bottom faces and diahragm is applied against said upper faces.

6. A nuclear reactor comprising a pressure vessel closed at the top by a closure head and, within said vessel,
    a lower grid for supporting the reactor core, said grid being rigidly fixed to said vessel,
    an upper grid rigidly fixed to said vessel and placed at the level of connection between said vessel and said closure head, a plurality of fuel wrappers each having an open upper end and a closed lower end, said lower end being provided with means for fixing said fuel wrapper on said lower grid, each fuel wrapper being such as to contain at least one fuel assembly suspended from the upper end of said wrapper, a plurality of vertical maintaining units for maintaining said fuel assemblies within said wrappers, each maintaining unit being such as to have an upper end and a lower end, said upper end being joined to said upper support grid by a main elastic device which tends to thrust said maintaining units in the downward direction, said lower end being provided with at least two secondary elastic devices, each secondary elastic device being applied against the upper end of a fuel assembly.

7. A nuclear reactor comprising a pressure vessel closed at the top by a closure head and, within said vessel, a lower grid for supporting the reactor core, said grid being rigidly fixed to said vessel, an upper grid rigidly fixed to said vessel and placed at the level of connection between said vessel and said closure head, a plurality of fuel wrappers each having an open upper end and a closed lower end, said lower end being provided with means for remotely fixing said fuel wrapper on said lower grid, each fuel wrapper being such as to contain at least one fuel assembly suspended from the upper end of said wrapper, a plurality of maintaining units being disposed between said upper grid and said fuel assemblies, said wrappers being spaced at uniform intervals so as to form passages of constant thickness between the walls thereof, said passages being located in the two orthogonal directions and having a thickness greater than that of the arms of said movable cruciform control rods, each maintaining unit being constituted by a vertical cylindrical body provided internally with vertical partitions defining an axial passage and four radial slots which communicate with said passage so as to permit the arms of the movable control rods to pass therethrough, said slots being such as to form extensions of the portions of passage formed by said fuel wrappers and capable of being occupied by the arms of the same movable control rod.

8. A nuclear reactor according to claim 7 and comprising within said pressure vessel an intermediate grid placed above the upper end of said fuel wrappers and rigidly fixed to the upper grid, said grid being provided with orifices through which said secondary elastic devices are permitted to pass.

9. A nuclear reactor according to claim 7, wherein each maintaining unit comprises an upper connecting-flange
unit fixed on said upper support grid, said upper connecting-flange unit being connected elastically to the upper end of said body of said maintaining unit.

10. A nuclear reactor according to claim 7, wherein each secondary elastic device is attached to one end of a radial arm whose other end is attached to the lower end of the cylindrical body of the maintaining unit, each maintaining unit being constituted by a vertical locking-pin having an upper end and a lower end, the lower end of said locking-pin being applied against the upper end of a fuel assembly, the upper end of said locking-pin being elastically connected to the arm.

11. A nuclear reactor as set forth in claim 1 further comprising auxiliary screw means for securing each of said wrappers to said lower grid.

12. A wrapper for fuel assemblies as set forth in claim 2, further comprising auxiliary screw means for securing said wrapper to said lower grid.

* * * * *